Patented Feb. 23, 1937

2,071,367

UNITED STATES PATENT OFFICE 2,071,367

METHOD OF TREATING LACTIC FLUIDS

Samuel M. Weisberg and Arnold H. Johnson, Baltimore, Md., and Milton E. Parker, Danville, Ill., assignors to Research Laboratories of National Dairy Products Corporation, Inc., Baltimore, Md., a corporation of Maryland No Drawing. Application January 5, 1933,
Serial No. 650,364

9 Claims. (Cl. 99—55)

This invention relates to the making of a concentrated product derived from milks such as buttermilk and skimmilk and particularly useful for human consumption, as well as poultry and stock animal feed.

It is the principal object of this invention to obtain (1) a more uniform product; (2) a product of increased protein and fat content; (3) a product which may be readily stored without objectionable crystallization or caking and having excellent keeping qualities; and (4) a product having an improved appearance and lustre.

The usual mode of procedure is to collect the buttermilk and allow it to develop a titratable acidity of approximately 1.5% (lactic acid) in an unsterilized vat or container. Thereafter the whole dilute batch is preheated and pasteurized at a high temperature and suitably concentrated in a vacuum pan or other apparatus to obtain the conventional condensed buttermilk.

The product so produced is frequently objectionable in that (1) it has a dark color, (2) often during the process and in storage undesirable large coarse lactate crystals are formed and caking takes place, (3) due to the variety of organisms likely to be present, the product does not always have a clean lactic acid taste nor a constant, satisfactory, reproducible, or controlled body or consistency, and (4) because the entire dilute mass must be condensed, the time period required for concentrating frequently is too long to obtain a profitable article as the amount of heat used to concentrate is excessive.

The present invention aims to overcome these objections by producing a product which (a) is more consistent and uniform; (b) has a higher concentration of protein and fat than heretofore possible or customary; (c) has a better color, being substantially creamy in appearance; (d) has a high lustre; (e) has a more constant smooth and pasty consistency; (f) is free from crystalline formations, and (g) is reproducible, that is, the treatment of the buttermilk is controlled as by introduction of a suitable culture or other means to obtain from various types of buttermilk a substantially uniform end product.

It is, therefore, a very important object of the present invention to produce a condensed buttermilk product of smooth and pasty consistency, which condition is maintained for long storage periods. This product is characterized by a calcium lactate content reduced relative to that excessively present where the semi-solid is made by concentration of the entire buttermilk, i. e., to a point where the product is no longer saturated with this compound. That is to say, the calcium lactate is present in substantial amount in the condensed buttermilk product but the amount is not enough to super-saturate the product under many conditions. Heretofore when the entire buttermilk body was concentrated, the calcium lactate was present in such large amount that there was a very objectionable tendency to crystallize as when the product was stored under low temperatures or subjected to high temperatures which would produce evaporation of the water. That is, the product would be super-saturated with calcium lactate and large crystals of this compound would form. In the present case, the calcium lactate content is reduced, and the proteins present are in such proportion that if the product is subjected to low or high temperature conditions, the proteins will act to prevent any crystallization of the calcium lactate, notwithstanding that it be present in amount sufficient to super-saturate the product. Therefore, conditions are not favorable for the formation of large coarse crystals of calcium lactate because the product of this invention is characterized by a high protein content which acts as a protective colloid and retards the formation of large coarse crystals. These two qualities of the condensed buttermilk product of this invention, therefore, enable the product to retain its normal consistency without objectionable crystallization and caking.

The product of the present invention is further characterized by having the lactic acid present substantially pure and since this compound is a bacterial antiseptic, it preserves and enhances the keeping quality of the product. Moreover, the product has a highly improved taste since the acid present in it is substantially pure lactic acid.

Another object of the invention is to employ a method wherein useful chemical by-products are obtainable—for example, the lactates of calcium, magnesium, or other combinations of lactic acid.

In addition to the important objects already related, it is a further object of this invention to produce an improved powdered buttermilk product.

We shall describe several successful processes to produce the foregoing objects and for clarity shall segregate them. We shall assume, as in ordinary cases, that the sweet or sour buttermilk or milk is collected and discharged into an open vat, generally of wood, having a substantial capacity and which is usually unsterilized.

Process A

This is the preferred process and we find it important to operate in the isoelectric region of the buttermilk proteins.

In this region positive and negative charges on the protein particles are equal, and therefore they exhibit their maximum precipitability and their minimum viscosity. By reason of this condition we are able to obtain a more complete and rapid separation of the liquid and soluble portions from the colloidal or solid constituents as will be now more fully described. The pH of this isoelectric region is substantially 4.6–5.0 and if the milk has not acquired substantially this acidity, we prefer to allow it to naturally sour further. Again, this optimum acidity may be obtained by adding directly to the buttermilk a required quantity of acid, such as hydrochloric, acetic, lactic, or in fact any of the edible acids. We prefer to operate in the isoelectric region of the buttermilk proteins for the reason that in this region, the milk proteins are especially subject to coagulation and settling.

If the pH registers substantially 4.6–5.0 (the isoelectric region), the milk has soured and has acquired the desired acidity. The vat and contents are heated with agitation, to substantially 130°–180° F. A temperature of 140° is usually sufficient and when the batch reaches this point, the heating and agitation are discontinued, and the material allowed to remain quiet and to cool.

Heating the buttermilk to 140° F. or higher has a two-fold purpose—(1) it initiates rapid sedimentation or settling of the solid matter and (2) it provides a pasteurization treatment in that a marked destruction of the bacteria which constitute the normal flora of the buttermilk ensues. For effective sedimentation, a fairly rapid rate of cooling is preferred, which may be provided by air cooling or some controlled artificial cooling means employed. By controlled cooling, optimum settling is obtained rapidly in accordance with conditions surrounding the operation. The batch is cooled down at least to a temperature such that the solid particles coagulate and settle out and the formation of a turbid upper stratum in the batch is prevented. Normally, a drop in temperature of 5° to 10° F. the first hour, followed by 1° F. drop every hour thereafter, is satisfactory.

The batch, as will be understood, after the settling and cooling, is stratified in that there is observable an upper clear layer or whey and a lower layer containing the solids, which we will term the sludge.

The whey layer or liquid portion of the mass contains the truly soluble parts; that is, we have determined that there is in solution in this layer inorganic milk salts, such as calcium and magnesium lactates, a small amount of protein and fat and lactic acid.

The sludge consists of a portion of this whey and precipitated matter including colloids and a very large percentage of the proteins of the original buttermilk, for example, casein.

The settling treatment consumes anywhere from a few hours to sixteen hours, depending on the rate of cooling. The whey layer constitutes substantially forty to fifty percent, more or less, of the batch and the sludge the remainder. That is to say, the acidity and the temperature are so controlled that the ratio by volume of the sludge layer and whey layers to each other is substantially 1. This ratio is made possible by reason of the treatment affording control of the hydration of the protein as contrasted to a treatment wherein the proteins are more completely dehydrated and therefore hardened and excessively contracted. In other words, known processes produce a condensed buttermilk in which the casein is precipitated in such a manner that the particles are made extremely fine and settle into a very small volume, i. e., are highly concentrated, thereby highly concentrating the dehydrated casein. On the other hand, the present invention comprises a much more dilute suspension of the protein and the particles are present in substantially unhardened condition.

The whey layer or clear liquid is now siphoned from the vat and is treated as will be later described.

To the sludge layer is added an organism of the Bulgaricus type or any other suitable lactic acid producing organism in amount sufficient to give a rapid development of lactic acid and crowd out with reasonable completeness any other organisms present in the buttermilk sludge which may have survived the pasteurization induced by the sedimentation temperature. This inoculation of lactic acid organisms imparts a clean lactic acid taste to the sludge, which, of course, carries on through to the final product and also controls the body of the final product. The temperature is preferably maintained at substantially 100° to 125° F. and usually at 115° F. and the batch agitated. The temperature, in other words, should be low enough not to kill or inhibit action of the lactic acid producing organism and high enough to insure optimum lactic acid development. In this manner, much of the lactose is utilized to form lactic acid.

This development is continued until the titratable acidity (lactic) shows 1.4%–2% and usually 1.6%–1.7%.

Thereupon, the sludge is heated to a high temperature, normally 180° F., and during such process repasteurized and then transferred to a vacuum pan or other apparatus such as a centrifugal machine and concentrated to the required total solids content.

Process B

In this process the buttermilk, which may or may not be initially treated as described to be at the isoelectric point, is first heated with agitation in the vat to 100° to 125° F., usually 115° F. in the presence of a pure culture of the acid producing organism, and the heating then discontinued. In some cases, the organism is added after the mass is brought to the desired temperature. The mass is allowed to cool and the acid to develop to the same titratable acidity as in Process A and then the batch is heated without agitation to substantially 140° F. to provide a more complete sedimentation. Sedimentation or settling with cooling as described takes place until a stratified mass is obtained having the upper and clear whey layer, (substantially 40% to 50%, more or less), and the sludge layer. The whey layer is siphoned and the sludge concentrated, as described.

This process is desirable in some cases, the lactic acid producing organism being added and the acid development accomplished prior to separation of the strata.

Process C

The buttermilk may or may not be the same as B at the isoelectric point and is initially warmed with agitation in the presence of the lactic acid producing organism to an optimum temperature, namely 100° to 125° F., preferably 115° F., and heating discontinued. If desired, the organism is added after the required temperature of the batch is reached. The batch is allowed to cool and the fermentation continue without agitation until optimum sedimentation (as determined by means of a glass window), and acid development are obtained, the latter determined by titration, namely 1.4%–2.0% and preferably 1.6%–1.7%. Thereafter, the whey and sludge are separated and the sludge concentrated as described.

In each of Processes A, B and C, it will be observed that we resort to the use of an organism to develop the acidity and this expedient we find reduces the time required to develop acidity over present procedure by at least twelve to sixteen hours.

Process D

In this process, we follow in general the operations outlined, but do not add the organism, depending upon the organisms present in the buttermilk to promote the cidity. The buttermilk may or may not be at the isoelectric point and is heated up to a moderate temperature, that is the temperature at which the lactic organisms normally present in the buttermilk produce acid most rapidly, normally 100° to 110° F. The acid development is obtained by permitting fermentation of the batch to continue at substantially the temperature recited or having reached the optimum desired temperature, heating is stopped and the mass allowed to stand in the vat, which is usually unsterilized, until the desired acidity is reached. The batch having settled, separation is then accomplished to obtain the whey layer and the sludge layer, and the latter concentrated as described.

In this connection, the heating step referred to may be omitted and fermentation permitted to the required titratable acidity and the strata separated.

Process E

In this process the buttermilk is brought to the isoelectric region of the proteins by adding directly to the buttermilk a required quantity of acid such as hydrochloric acid, acetic acid, lactic acid, or in fact any of the edible acids. The buttermilk having a pH of 4.6–5.0 may now be heated to the optimum temperature which will promote rapid settling usually in the vicinity of 140° F. However, heating is not essential and the mass having been brought to the required pH with or without preheating permitted to stand, since, as stated in the isoelectric region of the proteins the desired efficient stratification will result. Thereafter the separation and further treatment takes place as described above.

Each of the several processes hereinabove outlined are applicable in connection with skimmed milk or buttermilk having various degrees of acidity, that is to say, milks which are termed sweet or sour.

It will be understood that the important consideration in each case is the stratification of the milk, i. e., skimmilk, buttermilk or other milks and milk products at the isoelectric region of the proteins when optimum stratification is obtainable. This is true with respect to milks which are naturally soured, or soured by the addition of an organism, or by the direct addition of an edible acid.

In each of Processes A, B, C, D and E, it will be observed that instead of concentrating the entire mass as now carried out, we resort to the concentration of the sludge only. This has the important advantages of producing an article which (1) is more consistent and uniform, (2) has a higher concentration of protein and fat than heretofore possible or customary, (3) has a better color, being substantially creamy in appearance, (4) has a high lustre, (5) has a more constant smooth and pasty consistency, and (6) is free from crystalline formations.

The condensed buttermilk product obtained from following the procedures set forth above of each of Processes A, B, C, D and E, is in the form of a pasty body of smooth and creamy consistency and high lustre. The product contains lactic acid, fat, protein, milk solids and some milk sugar, and differs from the conventional condensed buttermilk in that it has a relatively high protein and fat content. Whereas the conventional condensed buttermilk contains substantially 9% to 10% protein and 2% fat, the condensed buttermilk product of this invention has been found to contain 12½% protein and 2½% fat or better.

The concentrated or end product obtained from each of Processes A, B, C, D and E invariably has a heavy body. This heavy body is due to the increased protein content and the hydration thereof. This hydration is reduced if necessary by resorting to a digestion step applicable (1) to the sludge obtained in Processes A, B, C, D and E set forth above or (2) to the milk or buttermilk mass during the sedimentation and fermentation steps.

The purpose of this digestion step is to obtain for a given body a proper and determined solids content. This additional step involves the addition of a suitable enzyme, such as pepsin, in a concentration below the optimum, i. e., to accomplish partial digestion, which in the case of pepsin normally amounts to ¾ ounce per thousand pounds of sludge. The enzyme is added preferably to the sludge as its addition to the buttermilk mass results in increased milk solid loss in the whey stratum. In addition to pepsin, equally satisfactory results may be obtained by the use of papain, trypsin, or other proteoclastic enzymes of either plant or animal origin. Since the buttermilk mass or sludge normally has an acid reaction of pH 4.6 to 5, the addition of a suitable enzyme will partly digest or soften the protein sufficiently to allow a higher concentration of the sludge. In the case of concentration of the sludge in vacuo, it has the added advantage of materially hastening the removal of moisture by evaporation. The partially digested sludge is then heated to a high temperature, normally 180° F., which inactivates the enzyme, and then transferred to a vacuum pan or other apparatus such as a centrifuge and concentrated to the desired solids content.

In accordance with the treatments described in the several processes, it will be understood that, by reason of the temperatures and conditions under which the stratification is carried out, a substantial portion of the water naturally present in the buttermilk is efficiently and easily removed and a sludge layer formed which contains the various buttermilk solids, namely, lactic acid, fat, protein, milk salts and milk sugar, in such a ratio to each other as to give a highly nutritive semi-solid buttermilk when the sludge layer is separated out and concentrated and condensed as in a vacuum pan. This is true because the stratification takes place in a manner such that the proteins are in dilute suspension in the sludge layer and this sludge layer constitutes anywhere between fifty and sixty percent of the initial buttermilk volume. Hence, a proportionately larger percentage of the buttermilk nutrients are present in the sludge layer. Therefore, when the sludge layer is concentrated, the semi-solid is enriched by the presence of these nutrients and the protein and may be concentrated to remove the water without impairing the nutrient quality of the final semi-solid.

The product obtained by concentrating the sludge prepared with the additional step of enzyme addition permits readily a total solids content of substantially 27% or better.

Whey treatment

The clear whey is useful for the manufacture of combinations of lactic acid and in particular calcium lactate.

The whey contains lactic acid, calcium, lactate, lactose, milk salts, and a small amount of protein.

The whey is first neutralized with $Ca(CH)_2$, CaO or $CaCO_3$ to a pH of 7.0–7.5. Then, if necessary, a small amount of a lactic forming organism, such as mentioned above, or any good lactic acid producing organism is added to develop acid from all or any part of the residual lactose.

The acidity is allowed to develop for ten to twenty-four hours, and slaked lime, unslaked lime, or calcium carbonate is continually added to keep the pH at about 7.0 or until acid ceases to develop at a reasonably rapid rate indicating that a substantial portion of the lactose has been used up.

The mass is now heated to substantially 180° F. Then it is allowed to cool and settle or sediment for substantially two hours. Prior to this heating step, charcoal, kieselguhr or other clarifier may be added, with or without the addition of ammonia.

The supernatant liquor is centrifuged or siphoned off and transferred to a vacuum pan or suitable centrifuge and concentrated. The concentrated liquor is then seeded fairly generously with crystals of pure calcium lactate to speed crystallization and kept in a cool place. Under these conditions, a mass of calcium lactate crystals appear in a few hours. These crystals are washed and purified by recrystallization or other treatment.

Dried milk product

We have found that an improved dried milk product or feed can be produced by taking the milk or buttermilk sludge, either with or without additional or preliminary concentration, and subjecting it to any suitable drying process. However, this sludge must be prepared by a sedimentation process wherein no extensive acid fermentation has taken place in order to avoid lumping or caking of the final product. This can be accomplished, for example, by applying Process A, described above, to the buttermilk mass but eliminating the steps of fermenting with a lactic culture or the addition of an enzyme. Furthermore, it is desirable to use a higher sedimentation temperature, usually 160° F.

The dried product is then powdered in any suitable apparatus. The process of forming the dried buttermilk product, as with the condensed buttermilk product and process set forth above, is preferably a continuous operation. The dried buttermilk product so obtained has the important advantages of (1) having a lighter, more attractive appearance, being substantially white; (2) having a higher concentration of protein and fat than heretofore possible or customary; and (3) being free from the tendency to lump or cake.

The dried milk or buttermilk of this invention contains lactic acid, lactose, fat, protein, milk salts and other milk solids, and differs from the conventional dried buttermilk or milk in that it has a higher protein and fat content than heretofore possible or customary. Whereas the conventional dried buttermilk contains substantially 35% protein and 7% fat, the dried buttermilk of this invention has been found to contain 45% protein and 8% fat or better.

We claim:

1. The process of preparing a condensed buttermilk product which comprises heating and cooling the buttermilk and forming a stratified mass having a clear relatively thin upper stratum or whey containing a low solids content and substantially all of the truly soluble constituents and a lower stratum or sludge comprising the colloidal constituents, separating one from the other, treating the sludge with a suitable enzyme to partially digest the hydrated colloidal constituents and concentrating the partially digested sludge to the required consistency.

2. The process of preparing a condensed buttermilk product which comprises heating and cooling the buttermilk and forming a stratified mass having a clear relatively thin upper stratum of whey containing a low solids content and substantially all of the truly soluble constituents and a lower stratum of sludge comprising the colloidal constituents, separating one from the other, treating the sludge with pepsin to partially digest the hydrated colloidal constituents and concentrating the partially digested sludge to the required consistency.

3. The process of preparing a condensed buttermilk product which comprises stratifying the mass into a whey layer and a sludge layer, separating one from the other, treating the sludge to produce a titratable acidity of 1.4–2.0 percent (lactic acid) and concentrating the sludge to the required consistency.

4. The process of preparing a condensed buttermilk product which comprises stratifying the mass into a whey layer and a sludge layer, separating one from the other, treating the sludge with acid forming bacteria to produce a titratable acidity of 1.4–2.0 per cent (lactic acid) and concentrating the sludge to the required consistency.

5. The process of preparing a condensed buttermilk product which comprises heating the buttermilk and cooling to form a stratified mass comprising a whey layer and a sludge layer, separating the one from the other, treating the sludge with acid forming bacteria to produce a titratable acidity of 1.4–2.0 percent, and concentrating the sludge layer to the required consistency.

6. The process of preparing a condensed buttermilk product which comprises bringing the buttermilk to the isoelectric region of the buttermilk proteins, in which region the milk proteins are especially subject to coagulation and settling, treating the buttermilk to form a stratified mass comprising layers of whey and sludge respectively, separating one from the other, treating the sludge with a suitable enzyme to partially digest the hydrated colloidal constituents and concentrating the partially digested sludge to the required constituency.

7. The process of preparing a condensed buttermilk product which comprises bringing the buttermilk to the isoelectric region of the buttermilk proteins, in which region the milk proteins are especially subject to coagulation and settling, treating the buttermilk to form a stratified mass comprising layers of whey and sludge respectively, separating one from the other, treating the sludge with pepsin to partially digest the hydrated colloidal constituents and concentrating the partially digested sludge to the required consistency.

8. The process of preparing a condensed buttermilk product which comprises operating in the isoelectric region of the buttermilk proteins by heat treatment and a controlled rate of cooling, and stratifying the dilute mass into a whey layer and a sludge layer, separating one from the other, treating the sludge with acid forming bacteria to produce a titratable acidity of 1.4–2.0 percent (lactic acid) and concentrating the sludge to the required consistency.

9. The process of preparing a concentrated milk product, which comprises stratifying the milk into whey and sludge layers, digesting the sludge to soften the protein sufficiently to allow a higher concentration of the sludge, and concentrating the sludge.

SAMUEL M. WEISBERG.
ARNOLD H. JOHNSON.
MILTON E. PARKER.